(12) United States Patent
Gonuguntla et al.

(10) Patent No.: US 12,443,442 B2
(45) Date of Patent: Oct. 14, 2025

(54) DETERMINATION OF HARDWARE RESOURCE UTILIZATION

(71) Applicant: CITRIX SYSTEMS, INC., Fort Lauderdale, FL (US)

(72) Inventors: Swarupa Gonuguntla, Bangalore (IN); Ashoke Saha, Bangalore (IN)

(*) Notice: Subject to any disclaimer, the term of this patent is extended or adjusted under 35 U.S.C. 154(b) by 794 days.

(21) Appl. No.: 17/246,217

(22) Filed: Apr. 30, 2021

(65) Prior Publication Data
US 2022/0357988 A1   Nov. 10, 2022

(51) Int. Cl.
*G06F 9/50* (2006.01)
*G06F 21/60* (2013.01)

(52) U.S. Cl.
CPC .............. *G06F 9/50* (2013.01); *G06F 21/602* (2013.01); *G06F 2209/509* (2013.01)

(58) Field of Classification Search
CPC ........................................................ G06F 9/50
See application file for complete search history.

(56) References Cited

U.S. PATENT DOCUMENTS

| | | | | |
|---|---|---|---|---|
| 10,656,966 | B1* | 5/2020 | Grubin | G06F 9/5033 |
| 2006/0265689 | A1* | 11/2006 | Kuznetspv et al. | G06F 9/44 |
| 2012/0159367 | A1* | 6/2012 | Calcaterra et al. | G06F 3/048 |
| 2014/0115600 | A1* | 4/2014 | Jacobs et al. | G06F 9/5061 |
| 2018/0006806 | A1* | 1/2018 | Wang | H04L 9/0631 |
| 2018/0103018 | A1* | 4/2018 | Chauhan et al. | H04L 63/0471 |
| 2020/0326925 | A1* | 10/2020 | Nachimuthu et al. | G06F 8/65 |
| 2021/0397486 | A1* | 12/2021 | Daniels | G06F 9/5088 |
| 2022/0383324 | A1* | 12/2022 | Sheshadri et al. | G06Q 20/4016 |

* cited by examiner

*Primary Examiner* — James J Debrow

(57) ABSTRACT

A method may include determining a first weight for a first type of operation and a second weight for a second type of operation. The first weight may correspond to a first quantity of the first type of operation a hardware resource is capable of performing during a time interval. The second weight may correspond to a second quantity of the second type of operation the hardware resource is capable of performing during the time interval. Utilization of the hardware resource may correspond to a weighted sum of the respective quantities of the first type of operation and the second type of operation offloaded to the hardware resource. Allocation of hardware resources may be adjusted based on utilization. Related systems and articles of manufacture are also provided.

19 Claims, 7 Drawing Sheets

DETERMINATION OF HARDWARE RESOURCE UTILIZATION

TECHNICAL FIELD

The subject matter described herein relates generally to network computing and more specifically to determining the utilization of hardware resources.

BACKGROUND

Cryptography refers to the practice of securing information which, in the digital age, includes transforming electronic data into a secure format for transmission across insecure networks. Doing so may prevent unauthorized access to the underlying information. For example, plaintext information may be encrypted, which converts the plaintext information from its original representation to a ciphertext that is unintelligible to unauthorized parties. Examples of encryption techniques include Rivest-Shamir-Adleman (RSA), Advanced Encryption Standard (AES), Elliptic Curve Cryptography (ECC), Data Encryption Standard (DES), Secure Hash Algorithms (SHA), Diffie-Hellman (DH), and/or the like.

SUMMARY

Methods, systems, and articles of manufacture, including computer program products, are provided for determining hardware resource utilization. In one aspect, there is provided a system including at least one data processor and at least one memory. The at least one memory may store instructions, which when executed by the at least one data processor, cause the at least one data processor to at least: determine a first weight for a first type of operation, the first weight corresponding to a first quantity of the first type of operation a first hardware resource is capable of performing during a time interval; determine a second quantity of the first type of operation offloaded to the first hardware resource during the time interval; determine, based at least on the first weight and the second quantity, a first utilization of the first hardware resource; and adjust, based at least on the first utilization, an allocation of hardware resources.

In some variations, one or more of the features disclosed herein including the following features can optionally be included in any feasible combination. The at least one data processor may be further caused to at least: determine a second weight for a second type of operation, the second weight corresponding to a second quantity of the second type of operation the first hardware resource is capable of performing during the time interval; determine a third quantity of the second type of operation offloaded to the first hardware resource during the time interval; and determine, further based at least on the second weight and third second quantity, the first utilization of the first hardware resource.

In some variations, the at least one data processor may be further caused to at least: determine a second weight for the first type of operation, the second weight corresponding to a second quantity of the first type of operation a second hardware resource is capable of performing during the time interval, the second hardware resource being a different type of hardware resource; determine a third quantity of the first type of operation offloaded to the second hardware resource during the time interval; determine, based at least on the second weight and third second quantity, a second utilization of the second hardware resource; and adjust, further based at least on the second utilization, the allocation of hardware resources.

In some variations, the allocation of hardware resources may be adjusted based on an average of the first utilization of the first hardware resource and the second utilization of the second hardware resource.

In some variations, the at least one data processor may be further caused to at least: detect an operation being offloaded for performance by the first hardware resource; and in response to the operation being the first type of operation, increment a counter associated with the first type of operation, the second quantity of the first type of operation offloaded to the first hardware resource during the time interval being determined based at least on a value of the counter.

In some variations, wherein the at least data processor may be further caused to at least: in response to the first utilization of the first hardware resource exceeding a first threshold value, increase the allocation of hardware resources; and in response to the first utilization of the first hardware resource being below a second threshold value, decrease the allocation of hardware resources.

In some variations, the at least one data processor may be further caused to at least: in response to the first utilization of the first hardware resource increasing at an above-threshold rate, increase the allocation of hardware resources; and in response to the first utilization of the first hardware resource decreasing at the above-threshold rate, decrease the allocation of hardware resources.

In some variations, the first hardware resource may include a cryptographic accelerator dedicated to performing cryptographic operations.

In some variations, the first type of operation may include a Rivest-Shamir-Adleman (RSA) operation, an Advanced Encryption Standard (AES) operation, a Elliptic Curve Cryptography (ECC) operation, a Data Encryption Standard (DES) operation, a Secure Hash Algorithms (SHA) operation, or a Diffie-Hellman (DH) operation.

In some variations, the first hardware resource may be part of an application delivery controller configured to perform a Secure Socket Layer (SSL) offload by at least performing the second quantity of the first type of operation.

In another aspect, there is provided a method for determining hardware resource utilization. The method may include: determining a first weight for a first type of operation, the first weight corresponding to a first quantity of the first type of operation a first hardware resource is capable of performing during a time interval; determining a second quantity of the first type of operation offloaded to the first hardware resource during the time interval; determining, based at least on the first weight and the second quantity, a first utilization of the first hardware resource; and adjusting, based at least on the first utilization, an allocation of hardware resources.

In some variations, one or more of the features disclosed herein including the following features can optionally be included in any feasible combination. The method may further include: determining a second weight for a second type of operation, the second weight corresponding to a second quantity of the second type of operation the first hardware resource is capable of performing during the time interval; determining a third quantity of the second type of operation offloaded to the first hardware resource during the time interval; and determining, further based at least on the second weight and third second quantity, the first utilization of the first hardware resource.

In some variations, the method may further include: determining a second weight for the first type of operation, the second weight corresponding to a second quantity of the first type of operation a second hardware resource is capable of performing during the time interval, the second hardware resource being a different type of hardware resource; determining a third quantity of the first type of operation offloaded to the second hardware resource during the time interval; determining, based at least on the second weight and third second quantity, a second utilization of the second hardware resource; and adjusting, further based at least on the second utilization, the allocation of hardware resources.

In some variations, the allocation of hardware resources may be adjusted based on an average of the first utilization of the first hardware resource and the second utilization of the second hardware resource.

In some variations, the method may further include: detecting an operation being offloaded for performance by the first hardware resource; and in response to the operation being the first type of operation, incrementing a counter associated with the first type of operation, the second quantity of the first type of operation offloaded to the first hardware resource during the time interval being determined based at least on a value of the counter.

In some variations, the method may further include: in response to the first utilization of the first hardware resource exceeding a first threshold value, increasing the allocation of hardware resources; and in response to the first utilization of the first hardware resource being below a second threshold value, decreasing the allocation of hardware resources.

In some variations, the method may further include: in response to the first utilization of the first hardware resource increasing at an above-threshold rate, increasing the allocation of hardware resources; and in response to the first utilization of the first hardware resource decreasing at the above-threshold rate, decreasing the allocation of hardware resources.

In some variations, the first hardware resource may include a cryptographic accelerator dedicated to performing cryptographic operations.

In some variations, the first type of operation may include a Rivest-Shamir-Adleman (RSA) operation, an Advanced Encryption Standard (AES) operation, a Elliptic Curve Cryptography (ECC) operation, a Data Encryption Standard (DES) operation, a Secure Hash Algorithms (SHA) operation, or a Diffie-Hellman (DH) operation.

In another aspect, there is provided a computer program product that includes a non-transitory computer readable medium. The non-transitory computer readable medium may store instructions that cause operations when executed by at least one data processor. The operations may include: determining a first weight for a first type of operation, the first weight corresponding to a first quantity of the first type of operation a first hardware resource is capable of performing during a time interval; determining a second quantity of the first type of operation offloaded to the first hardware resource during the time interval; determining, based at least on the first weight and the second quantity, a first utilization of the first hardware resource; and adjusting, based at least on the first utilization, an allocation of hardware resources.

Implementations of the current subject matter can include methods consistent with the descriptions provided herein as well as articles that comprise a tangibly embodied machine-readable medium operable to cause one or more machines (e.g., computers, etc.) to result in operations implementing one or more of the described features. Similarly, computer systems are also described that may include one or more processors and one or more memories coupled to the one or more processors. A memory, which can include a non-transitory computer-readable or machine-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including, for example, to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to determining the utilization of cryptographic hardware resources, it should be readily understood that such features are not intended to be limiting. The claims that follow this disclosure are intended to define the scope of the protected subject matter.

DESCRIPTION OF DRAWINGS

When practical, like reference symbols in the various drawings indicate like elements.

DETAILED DESCRIPTION

Figure 1:
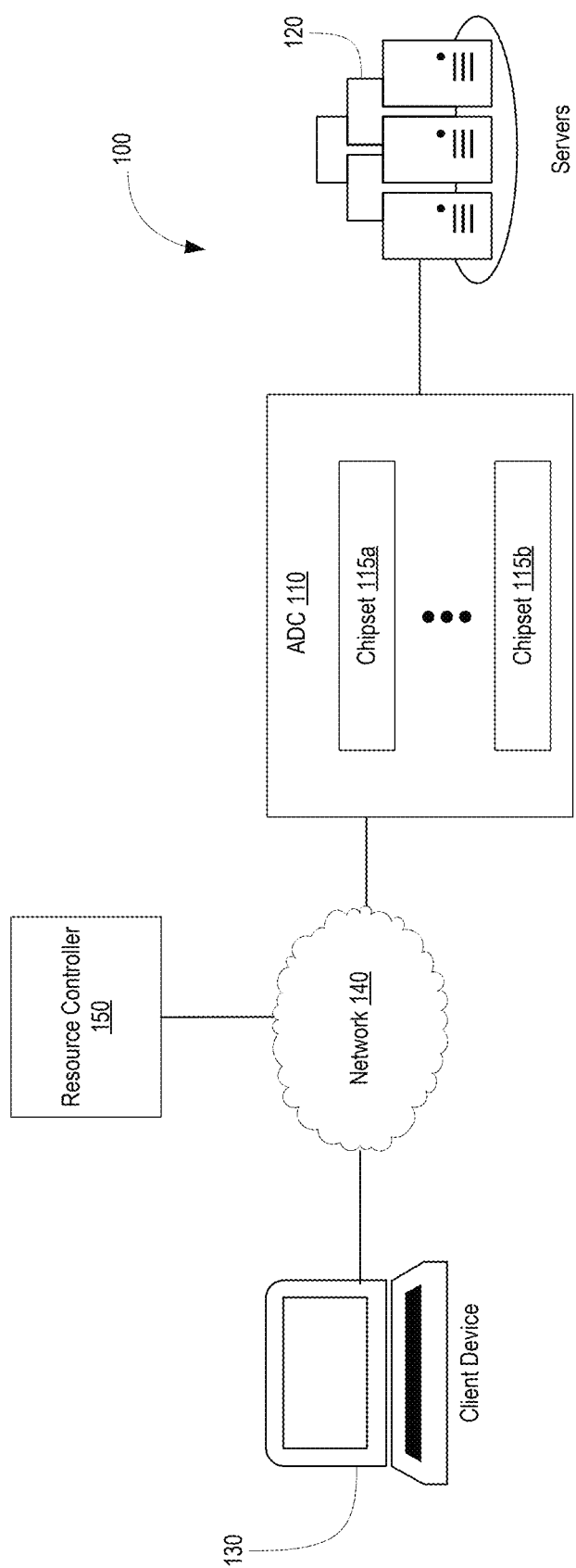
FIG. 1 depicts a system diagram illustrating an example of a hardware resource controller system, in accordance with some example embodiments.

Cloud computing can include the on-demand availability of a pool of shared computing resources, such as computer networks, server, data storage, software applications, and services, without direct active management by the user. The phrase can be used to describe computing resources made available to multiple users over a wired network and/or a wireless network such as a local area network (LAN), a virtual local area network (VLAN), a wide area network (WAN), a public land mobile network (PLMB), and/or the Internet. Access to the shared computing resources may be controlled by a network appliance called an application delivery controller (ADC). For example, the application delivery controller may provide access to software applications hosted in a datacenter and delivered as Software as a Service (SaaS) across a range of client devices.

To maintain a secure connection between a client device and the servers in the data center, the data exchanged between the client device and the servers at the data center may be encrypted using cryptographic protocols such as Secure Socket Layer (SSL), Transport Layer Security (TLS), and/or like. Instead of being performed at the servers, the encryption and decryption of network traffic may be performed by the application delivery controller. Moreover, in addition to cryptography (e.g., Secure Socket Layer (SSL) offloading), the application delivery controller may also provide a variety of additional functionalities including, for example, load balancing, traffic optimization, traffic chaining and steering, web application firewall, carrier-grade network address translation (CGNAT), domain name system (DNS), proxy and reverse proxy, and/or the like.

The application delivery controller may include one or more hardware resources dedicated to the performance of certain operations such as cryptographic operations. For example, the application delivery controller may include one or more cryptographic accelerators, which are co-processors designed specifically for the performance of cryptographic operations. Insight into hardware resource utilization, such as the proportion of available hardware resources being used at any one time, may enable more efficient allocation of hardware resources. However, conventional hardware resources, such as cryptographic accelerators, do not have efficient mechanisms for reporting utilization metrics. For instance, obtaining usage data from a cryptographic accelerator in real time may deteriorate the performance of the cryptographic accelerator.

In some example embodiments, hardware resource utilization, for example, at an application delivery controller with one or more accelerator chipsets, may be determined based on a quantity of operations offloaded to each accelerator chipset and a weight corresponding to a quantity of operations required to saturate each accelerator chipset. Hardware resource allocation at the application delivery controller, such as the allocation of cryptographic accelerator chipsets, may be made based at least on the hardware resource utilization. For example, more accelerator chipsets may be allocated when hardware resource utilization exceeds a threshold value or remains excessively high for more than a threshold quantity of time. Alternatively and/or additionally, less accelerator chipsets may be allocated when hardware resource utilization falls below a threshold value or remains low for more than a threshold quantity of time. More (or less) accelerator chipsets may also be allocated based on one or more trends in hardware resource utilization such as an above threshold rate of increase (or decrease) in hardware resource utilization.

A variety of operations, such as different types of cryptographic operations, may be offloaded to the application delivery controller including. Examples of different types of cryptographic operations, for example, may include Rivest-Shamir-Adleman (RSA), Advanced Encryption Standard (AES), Elliptic Curve Cryptography (ECC), Data Encryption Standard (DES), Secure Hash Algorithms (SHA), Diffie-Hellman (DH), and/or the like. Each type of operation may be associated with a different computational overhead. Different types of hardware accelerator chipsets may also be capable performing different quantities of the same type of operation. As such, a first type of hardware accelerator chipset may be capable of processing a first quantity of a first type of operations per second and a second quantity of a second type of operations per second. Different quantities of the first type of operation and/or the second type of operation may saturate a second type of hardware accelerator chipset.

Accordingly, the first type of operation may be associated with a first weight corresponding to the first quantity of the first type of operations required to saturate the first accelerator chipset while the second type of operations may be associated with a second weight corresponding to the second quantity of the second type of operations required to saturate the first type accelerator chipset. Furthermore, the first type of operation and/or the second type of operation may be associated with different weights corresponding to the different quantities of the first type of operation and/or the second type of operation required to saturate the second type of hardware accelerator chipset. Hardware resource utilization at an application delivery controller allocated with the first accelerator chipset and/or the second accelerator chipset may be determined based at least on a weighted sum of the respective quantities of the first type of operations and the second type of operations offloaded to each of the first accelerator chipset and/or the second accelerator chipset.

FIG. 1 depicts a system diagram illustrating an example of a cloud computing system 100, in accordance with some example embodiments. Referring to FIG. 1, the cloud computing system 100 may include an application delivery controller 110, one or more servers 120, and a client device 130. As shown in FIG. 1, the application delivery controller 110, the one or more servers 120, and the client device 130 may be communicatively coupled via a network 140. The client device 130 may be a processor-based device including, for example, a smartphone, a personal computer, a tablet computer, a wearable apparatus, an Internet-of-Things (IoT) appliance, and/or the like. The network 140 may be a wired network and/or a wireless network including, for example, a local area network (LAN), a virtual local area network (VLAN), a wide area network (WAN), a public land mobile network (PLMN), the Internet, and/or the like.

As shown in FIG. 1, the client device 130 may access one or more shared computing resources hosted on the one or more servers 120. For example, the application delivery controller 110 may provide access to a software application hosted on the one or more servers 120 and delivered as a Software as a Service (SaaS) to the client device 130. Instead of being performed at the one or more servers 120, the encryption and decryption of network traffic between the client device 130 and the one or more servers 120 may be offloaded to the application delivery controller 110. As such, the application delivery controller 110 may include one or more hardware resources, such as one or more cryptographic accelerator chipsets dedicated to the performance of cryptographic operations offloaded to the application delivery controller 110. The example of the application delivery controller 110 shown in FIG. 1 includes a first chipset 115a and a second chipset 115b but it should be appreciated that the application delivery controller 110 may include a different quantity of chipsets than shown.

Hardware resource utilization at the application delivery controller 110 may correspond to a proportion of the first chipset 115a and/or the second chipset 115b being used at any one time. This metric may be used to adjust the quantity of accelerator chipsets allocated at the application delivery controller 110. However, to avoid negatively impacting the performance of the first chipset 115a and the second chipset 115b, various implementations of the current subject matter enable a real time determination of hardware resource utilization without obtaining usage data directly from the first chipset 115a or the second chipset 115b.

Referring again to FIG. 1, the cloud computing system 110 may further include a resource controller 150 configured to determine a hardware resource utilization at the application delivery controller 110 and adjust the allocation of hardware resources at the application delivery controller 110 accordingly. According to some example embodiments, hardware resource utilization at the application delivery controller 110 may be determined based on a quantity of operations offloaded to the application delivery controller 110 and a weight corresponding to a quantity of operations required to saturate each accelerator chipset available at the application delivery controller 110 including, for example, the first chipset 115a, the second chipset 115b, and/or the like.

The first chipset 115a and the second chipset 115b may be configured to perform a variety of operations. For example, the first chipset 115a and the second chipset 115 may be dedicated to the performance of cryptographic operations such as Rivest-Shamir-Adleman (RSA), Advanced Encryption Standard (AES), Elliptic Curve Cryptography (ECC), Data Encryption Standard (DES), Secure Hash Algorithms (SHA), Diffie-Hellman (DH), and/or the like. As such, each of the first chipset 115a and the second chipset 115b may be capable of performing a different quantity of different types of operations per unit of time such as a first quantity of a first type of operations per second and a second quantity of a second type of operations per second. Moreover, the first chipset 115 and the second chipset 115b may be different types of accelerator chipsets capable of performing different quantities of the same type of operations per unit of time.

To determine hardware resource utilization at the application delivery controller 110, the resource controller 150 may determine a weight matrix for various types of accelerator chipsets including, for example, each type of accelerator chipset included in the application delivery controller 110. For example, if the first chipset 115a and the second chipset 115b are different types of accelerator chipsets, the resource controller 150 may determine a weight matrix M that includes a weight for each type of cryptographic operation corresponding to a quantity of the cryptographic operation required to saturate each of the first chipset 115a and the second chipset 115b. Moreover, the weight matrix M may be created by invoking the corresponding Secure Socket Layer (SSL) programming code. It should be appreciated that the weights associated with an accelerator chipset may be determined during the development and/or production of the accelerator chipset and may be subject to subsequent refinement based on data collected during runtime. Nevertheless, to avoid performance degradation, various implementations of the current subject matter avoids collecting real time usage data from accelerator chipsets.

Figure 2:
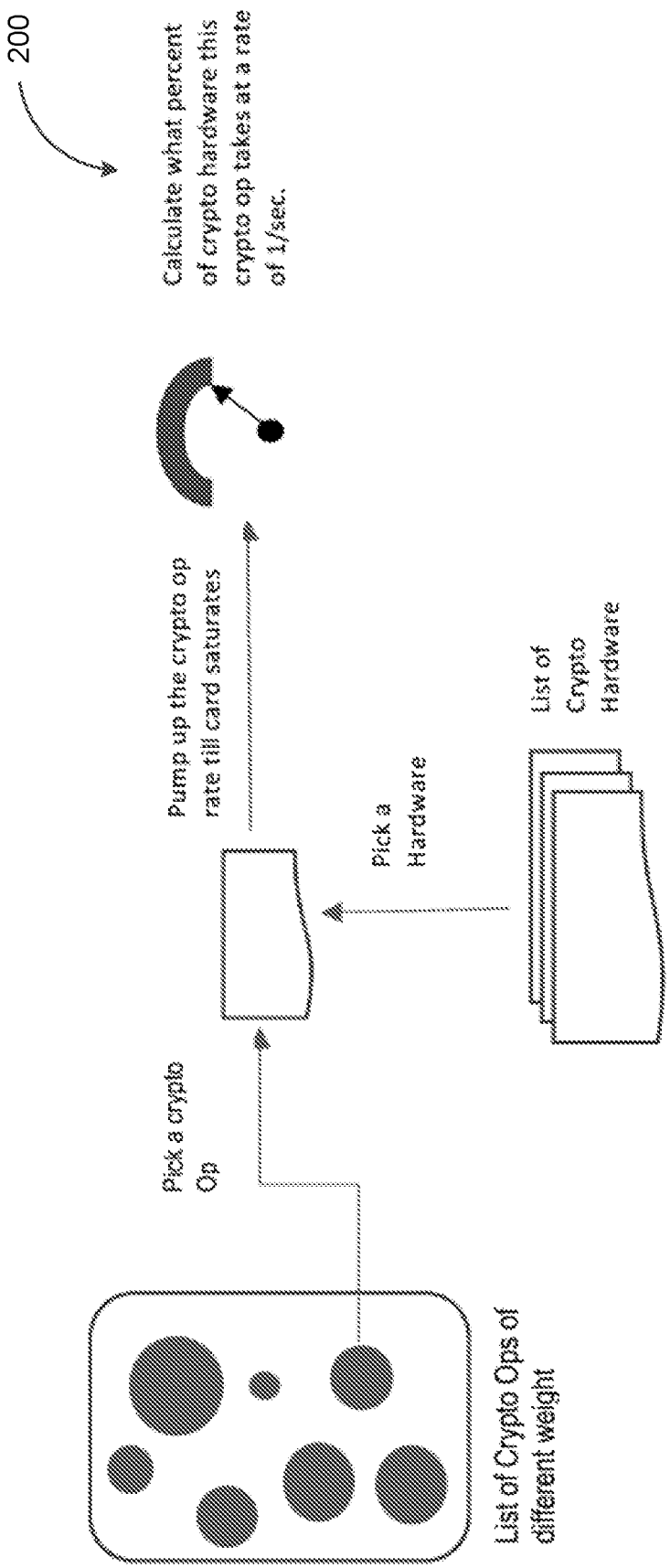
FIG. 2 depicts a schematic diagram illustrating an example of a process for determining a weight matrix, in accordance with some example embodiments.

To further illustrate, FIG. 2 depicts a schematic diagram illustrating an example of a process 200 for determining the weight matrix M. As shown in FIG. 2, the process 200 for determining the weight matrix M may include performing, at incrementally higher rates, each of a plurality of types of operations until the saturation point of a hardware resource such as a cryptographic accelerator chipset. The quantity of operations that is performed at this saturation point may correspond to a maximum quantity of operations that the accelerator chipset is capable of performing, for example, during a corresponding time interval. The inverse of this quantity may correspond to the proportion of the accelerator chipset being used to perform a single operation. A smaller weight may therefore indicate an operation with less computational overhead or requiring less hardware resources while a larger weight may indicate an operation with more computational overhead or requiring more hardware resources.

In some example embodiments, the weight matrix M may include a first weight $w_1$ corresponding to a first quantity of a first type of operation required to saturate the first chipset 115a per unit of time. For example, the first weight $w_1$ may correspond to an inverse of the first quantity $R_1$ of the first type of operation that the first chipset 115a is able to perform in one second $$(\text{e.g.}, w_1 = \frac{1}{R_1}).$$

Furthermore, the weight matrix M may include a second weight $w_2$ corresponding to a second quantity of a second type of operation required to saturate the first chipset 115a per unit of time. For instance, the second weight $w_2$ may correspond to an inverse of the second quantity $R_2$ of the second type of operation that the first chipset 115b is able to perform in one second $$(\text{e.g.}, w_2 = \frac{1}{R_2}).$$

Alternatively and/or additionally, the weight matrix M may include a third weight $w_3$ corresponding to an inverse of a third quantity $R_3$ of the first type of operation that the second chipset 115b is able to perform in one second $$(\text{e.g.}, w_3 = \frac{1}{R_3})$$

and/or a fourth weight $w_4$ corresponding to an inverse of a fourth quantity $R_4$ of the second type of operation that the second chipset 115b is able to perform in one second $$(\text{e.g.}, w_4 = \frac{1}{R_4}).$$

To further illustrate, Table 1 below depicts an example of the weight matrix M, which includes a weight w $$(\text{e.g.}, w = \frac{1}{R})$$

for a variety of cryptographic operations.

TABLE 1

| Cryptographic Operation | Chipset 1 | Chipset 2 |
| --- | --- | --- |
| RSA1k | 1/6000 | 1/8000 |
| RSA2K | 1/3000 | 1/4000 |
| RSA4K | 1/1000 | 1/1500 |
| EC_P256 | 1/1500 | 1/2000 |
| EC_P521 | 1/1000 | 1/1500 |
| ENC/DEC DP mode | 1/20000 | 1/40000 |

In some example embodiments, to determine the hardware resource utilization of the application delivery controller 110, the resource controller 150 may apply the matrix M to determine the utilization of each of the first chipset 115a and the second chipset 115b based on the respective traffic pattern at each of the first chipset 115a and the second chipset 115b. For example, utilization at the first chipset 115a for any one point in time t may be determined based on a quantity of each type of operation offloaded to the first chipset 115a and a respective weight of these operations. Accordingly, if a first quantity $q_1$ of the first type of operation and a second quantity $q_2$ of the second type of operation are offloaded to the first chipset 115a at a first time $t_1$, the utilization $U_1$ of the first chipset 115a at the first time $t_1$ may be determined based on Equation (1) below:

$$U_1 = q_1 w_1 + q_2 w_2 = \frac{q_1}{R_1} + \frac{q_2}{R_2} \quad (1)$$

The utilization of a chipset being offloaded various quantities q of n types of operations at any point in time t may be calculated based on the Equation (2) below:

$$U = \sum_{i=1}^{n} q_i w_i = \sum_{i=1}^{n} \frac{q_i}{R_i} \quad (2)$$

In some example embodiments, the resource controller 150 may monitor the traffic pattern at the application delivery controller 110 to determine the quantity q of operations offloaded to each of the first chipset 115a and the second chipset 115b. For example, the resource controller 150 may maintain, for each of the first chipset 115a and the second chipset 115b, a counter for each type of operation. Accordingly, the resource controller 150 may increment a first counter whenever the resource controller 150 detects the first type of operation being offloaded to the first chipset 115a and a second counter whenever the resource controller 150 detects the second type of operation being offloaded to the first chipset 115a. Alternatively and/or additionally, the resource controller 150 may increment a third counter whenever the resource controller 150 detects the first type of operation being offloaded to the second chipset 115b and a fourth counter whenever the resource controller 150 detects the second type of operation being offloaded to the second chipset 115b.

Table 2 below depicts examples of counters that may be maintained by the resource controller 150. According to some example embodiments, the resource controller 150 may maintain a timer in order to check and/or refresh the counter per unit of time (e.g., 1-second) associated with the hardware resource utilization computation. Moreover, some operations may be associated with multiple counters including, for example, a first counter for a symmetric cryptographic operation and as second counter an asymmetric cryptographic operation.

TABLE 2

| |
|---|
| Num_crypto_offload_rsa_1k |
| Num_crypto_offload_rsa_2k |
| Num_crypto_offload_rsa_4k |
| Num_crypto_offload_ecc_p256 |
| Num_crypto_offload_ecc_p521 |
| Num_crypto_offload_enc_dp |
| Num_crypto_offload_dec_dp |

To further illustrate, consider an example in which the first chipset 115a is offloaded, during a one-second time interval, 1000 RSA 2K cryptographic operations, 300 RSK 4k cryptographic operations, and 500 256-bit ECC cryptographic operations. Table 3 below depicts the corresponding counter values.

TABLE 3

| |
|---|
| Num_crypto_offload_rsa_2k = 1000 |
| Num_crypto_offload_rsa_4k = 300 |
| Num_crypto_offload_ecc_p256 = 500 |

Referring back to Table 1, which shows the respective weights of an RSA 2K cryptographic operation, an RSA 4K cryptographic operation, and a 256-bit EEC cryptographic operation being ⅓₀₀₀, ¹⁄₁₀₀₀, ¹⁄₁₅₀₀ and, the utilization $U_1$ at the first chipset 115a during that one-second interval may be 70% based on the computation shown in Equation (3) below.

$$U_1 = 1000 * 1/4000 + 300 * 1/1500 + 500 * 1/2000 = 0.70 \quad (3)$$

In some example embodiments, the resource controller 150 may display the utilization of each of the first chipset 115a and the second chipset 115b included in the application delivery controller 110 as part of Secure Socket Layer (SSL) statistics. An example of a display of these metrics is shown in Table 4 below.

TABLE 4

| | |
|---|---|
| >stat ssl | |
| SSL Summary | |
| # SSL cards present | 1 |
| # SSL cards UP | 1 |
| SSL engine status | 1 |
| SSL sessions (Rate) | 38497 |
| SSL coleto Asym utilization (%) | 70.08 |
| SSL coleto sym utilization (%) | 15.80 |

Figure 3:
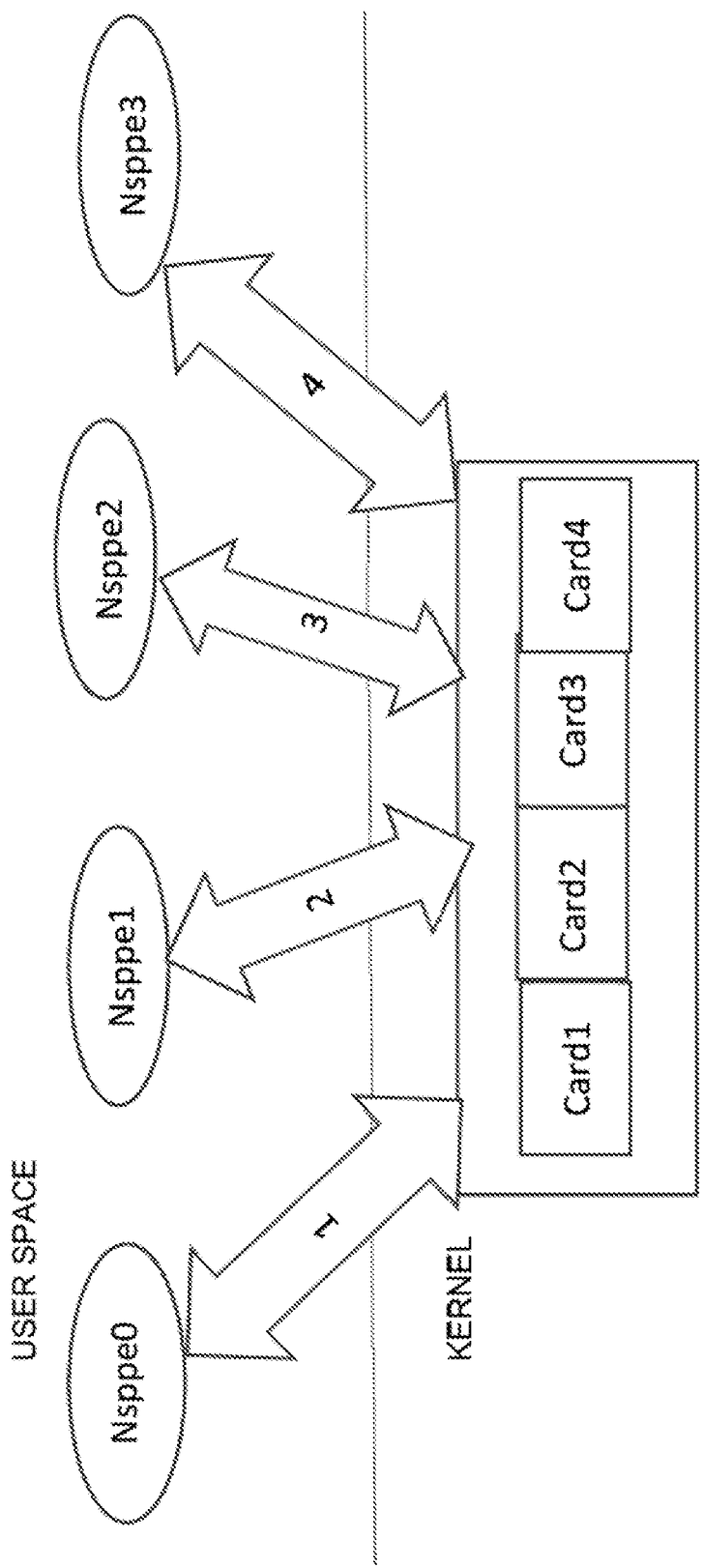
FIG. 3 depicts a schematic diagram illustrating an example of a deployment architecture, in accordance with some example embodiments.

Referring again to FIG. 1, at least a portion of the logic for hardware resource utilization may be implemented as part of a Secure Socket Layer (SSL) module of the packet engines included in the application delivery controller 110. FIG. 3 depicts a schematic diagram illustrating an example of the deployment architecture with four separate packet engines (e.g., Network Security Platform Packet Engines (NSPPE)) with the user space sharing four cryptographic hardware resources in the kernel through various communication channels. The Secure Socket Layer (SSL) module running in each packet engine may, through one of the communication channels, submit various cryptographic operations to a corresponding cryptographic hardware resource and receive a corresponding result. The utility for determining hardware resource utilization may be running as part of each packet engine, with the utilization associated with each packet engine being collected by an aggregator at the resource controller 150 and displayed as part of a command line interface (CLI).

In some example embodiments, the resource controller 150 may allocate, based at least on a hardware resource utilization, hardware resources at the application delivery controller 110. Hardware resource utilization at the application delivery controller 110 when the application delivery controller 110 includes multiple accelerator chipsets may correspond to an average (e.g., a mean, a medium, a mode, a range, and/or the like) of the respective utilizations of each accelerator chipset in the application delivery controller 110 including, for example, the first chipset 115a, the second chipset 115b, and/or the like.

Furthermore, the resource controller 150 may allocate more accelerator chipsets when hardware resource utilization at the application delivery controller 110 exceeds a threshold value (e.g., 90%) or remains excessively high for more than a threshold quantity of time (e.g., 90% for more than 10 minutes). Alternatively and/or additionally, the resource controller 150 may allocate less accelerator chipsets when hardware resource utilization falls below a threshold value (e.g., 50%) or remains low for more than a threshold quantity of time (e.g., 50% for more than 10 minutes). More (or less) accelerator chipsets may also be allocated at the application delivery controller 110 based on one or more trends in hardware resource utilization such as an above threshold rate of increase (or decrease) in hardware resource utilization.

Figure 4:
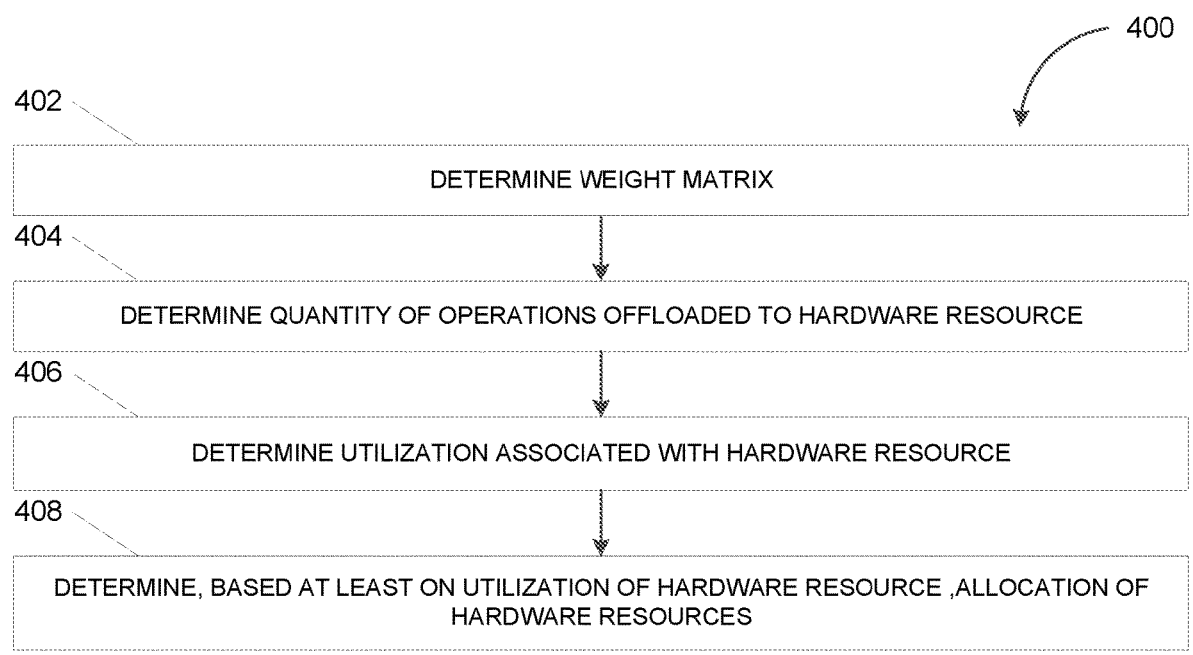
FIG. 4 depicts a flowchart illustrating another example of a process for managing hardware resources, in accordance with some example embodiments.

FIG. 4 depicts a flowchart illustrating an example of a process 400 for managing hardware resources, in accordance with some example embodiments. Referring to FIGS. 1-4, the process 400 may be performed by the resource controller 150 in order to manage the hardware resources, such as the first chipset 115a and the second chipset 115b, at the application delivery controller 110.

At 402, the resource controller 150 may determine a weight matrix. For example, the resource controller 150 may determine the weight matrix M, which may include weights for various types of accelerator chipsets included in the application delivery controller 110. If the first chipset 115a and the second chipset 115b are different types of accelerator chipsets, the resource controller 150 may determine a weight matrix M that includes a weight for each type of operation corresponding to a quantity of the operation required to saturate each of the first chipset 115a and the second chipset 115b. The weight w associated with a type of operation may correspond to an inverse of the quantity R of that type of operation required to saturate an accelerator chipset $$(e.g., w = \frac{1}{R}).$$

That is, the weight for a 256-bit ECC cryptographic operation for the first chipset 115a, for example, may correspond to a proportion of the first chipset 115a used to perform a single 256-bit ECC cryptographic operation.

At 404, the resource controller 150 may determine a quantity of operations offloaded to a hardware resource. In some example embodiments, to determine the quantity of operations offloaded to an accelerator chipset during a unit of time (e.g., a one-second time interval), the resource controller 150 may implement counter for each of type of operation that may be offloaded for performance to the accelerator chipset. As such, the resource controller 150 may increment a first counter whenever the resource controller 150 detects the first type of operation being offloaded to the first chipset 115a and a second counter whenever the resource controller 150 detects the second type of operation being offloaded to the first chipset 115a. Moreover, the resource controller 150 may increment a third counter whenever the resource controller 150 detects the first type of operation being offloaded to the second chipset 115b and a fourth counter whenever the resource controller 150 detects the second type of operation being offloaded to the second chipset 115b.

At 406, the resource controller 150 may determine a utilization associated with the hardware resource. For example, utilization at an accelerator chipset may corresponding to a weighted sum of the quantities of each type of operation offloaded to the accelerator chipset. Accordingly, if a first quantity $q_1$ of the first type of operation and a second quantity $q_2$ of the second type of operation are offloaded to the first chipset 115a at a first time $t_1$, the utilization $U_1$ of the first chipset 115a at the first time $t_1$ may be $$U_1 = q_1 w_1 + q_2 w_2 = \frac{q_1}{R_1} + \frac{q_2}{R_2}.$$

At 408, the resource controller 150 may determine, based at least on the utilization of the hardware resource, an allocation of hardware resources. In some example embodiments, the resource controller 150 may allocate, based at least on a hardware resource utilization, hardware resources at the application delivery controller 110. For example, the resource controller 150 may allocate more accelerator chipsets when hardware resource utilization at the application delivery controller 110 exceeds a threshold value (e.g., 90%) or remains excessively high for more than a threshold quantity of time (e.g., 90% for more than 10 minutes). Alternatively and/or additionally, the resource controller 150 may allocate less accelerator chipsets when hardware resource utilization falls below a threshold value (e.g., 50%) or remains low for more than a threshold quantity of time (e.g., 50% for more than 10 minutes). The resource controller 150 may also allocate more (or less) hardware resources, such as accelerator chipsets, at the application delivery controller 110 based on one or more trends in hardware resource utilization including, for example, an above threshold rate of increase (or decrease) in hardware resource utilization and/or the like.

In cases where the application delivery controller 110 includes multiple accelerator chipsets such as the first chipset 115a and the second chipset 115b, the hardware resource utilization at the application delivery controller 110 may correspond to an average (e.g., a mean, a medium, a mode, a range, and/or the like) of the respective utilizations of each of the first chipset 115a, the second chipset 115b, and/or the like.

Figure 5A:
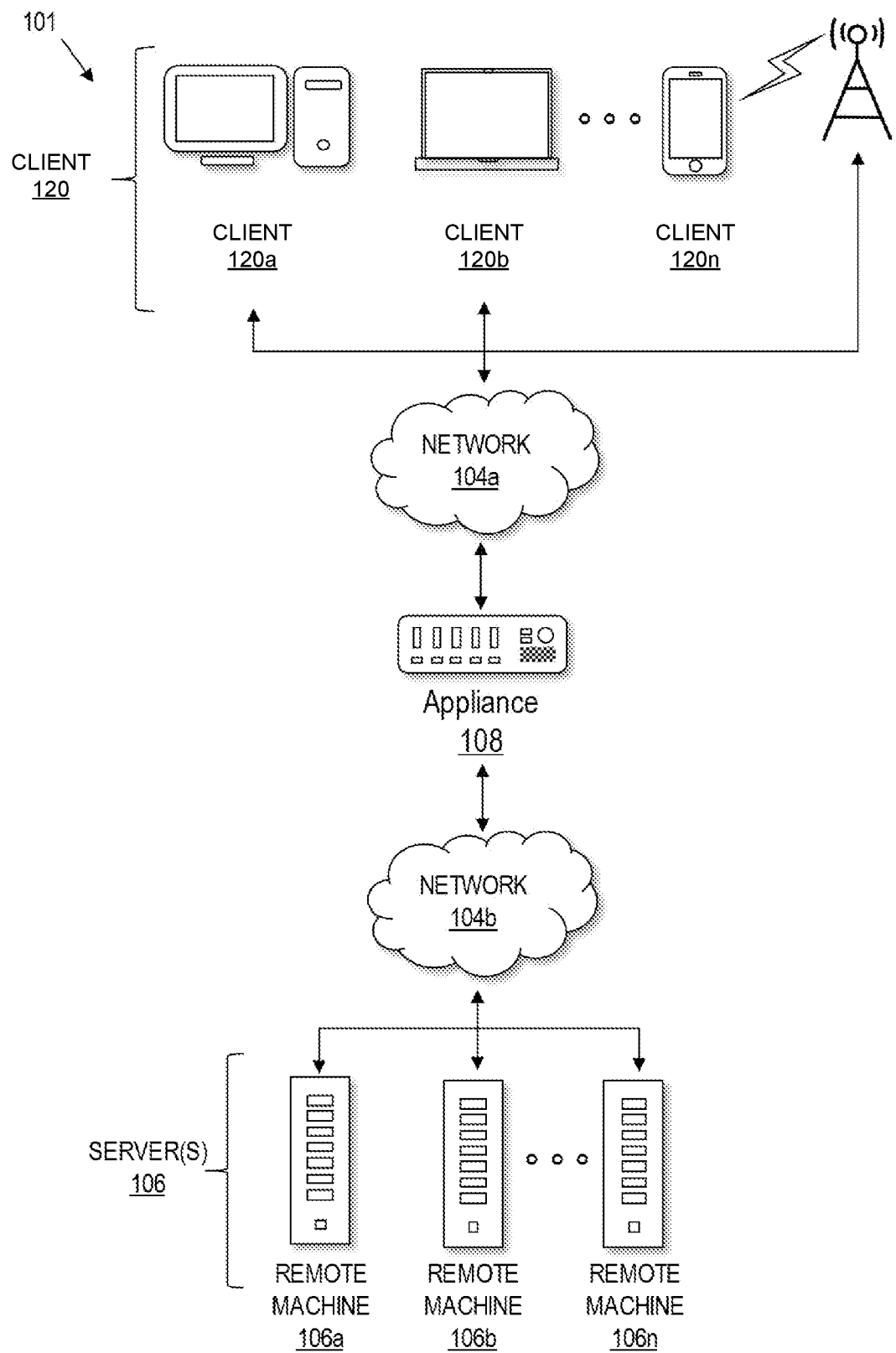
FIG. 5A depicts a network diagram illustrating an example of a network environment, in accordance with some example embodiments.

FIG. 5A depicts a network diagram illustrating an example of a network environment 101, in accordance with some example embodiments. Referring to FIGS. 1-4 and 5A, the network environment 101 in which various aspects of the disclosure may be implemented may include one or more clients 120a-120n, one or more remote machines 106a-106n, one or more networks 104a and 104b, and one or more appliances 108 installed within the network environment 101. The clients 120a-120n communicate with the remote machines 106a-106n via the networks 104a and 104b.

In some example embodiments, the clients 120a-120n may communicate with the remote machines 106a-106n via an appliance 108. The illustrated appliance 108 is positioned between the networks 104a and 104b, and may also be referred to as a network interface or gateway. In some example embodiments, the appliance 108 may operate as an application delivery controller (ADC) such as the application delivery controller 110 to provide clients with access to business applications and other data deployed in a datacenter, the cloud, or delivered as Software as a Service (SaaS) across a range of client devices, and/or provide other functionality such as load balancing and/or the like. In some example embodiments, multiple appliances 108 may be used, and the appliance(s) 108 may be deployed as part of the network 104a and/or 104b.

The clients 120a-120n may be generally referred to as client machines, local machines, clients, client nodes, client computers, client devices, computing devices, endpoints, or endpoint nodes. One or more of the clients 120a-120n may implement, for example, the client device 130 and/or the like. The remote machines 106a-106n may be generally referred to as servers or a server farm. In some example embodiments, a client 120 may have the capacity to function as both a client node seeking access to resources provided by a server 106 and as a server 106 providing access to hosted resources for other clients 120a-120n. The networks 104a and 104b may be generally referred to as a network 104. The network 104 including the networks 104a and 104b may be configured in any combination of wired and wireless networks.

The servers 106 may include any server type of servers including, for example: a file server; an application server; a web server; a proxy server; an appliance; a network appliance; a gateway; an application gateway; a gateway server; a virtualization server; a deployment server; a Secure Sockets Layer Virtual Private Network (SSL VPN) server; a firewall; a web server; a server executing an active directory; a cloud server; or a server executing an application acceleration program that provides firewall functionality, application functionality, or load balancing functionality. The servers 106 may include, for example, the resource controller 110 and/or the like.

A server 106 may execute, operate or otherwise provide an application that may be any one of the following: software; a program; executable instructions; a virtual machine; a hypervisor; a web browser; a web-based client; a client-server application; a thin-client computing client; an ActiveX control; a Java applet; software related to voice over internet protocol (VoIP) communications like a soft internet protocol telephone; an application for streaming video and/or audio; an application for facilitating real-time-data communications; a hypertext transfer protocol (HTTP) client; a file transfer protocol (FTP) client; an Oscar client; a Telnet client; or any other set of executable instructions.

In some example embodiments, a server 106 may execute a remote presentation services program or other program that uses a thin-client or a remote-display protocol to capture display output generated by an application executing on a server 106 and transmit the application display output to a client 120.

In yet other example embodiments, a server 106 may execute a virtual machine, such as the first virtual machine 125a and/or the second virtual machine 125b, to provide, for example, to the user 150 at the client device 130, access to a computing environment such as the virtual desktop 135. The virtual machine may be managed by, for example, a hypervisor (e.g., the first hypervisor 165a, the second hypervisor 165b, and/or the like), a virtual machine manager (VMM), or any other hardware virtualization technique within the server 106.

In some example embodiments, the network 104 may be a local-area network (LAN), a metropolitan area network (MAN), a wide area network (WAN), a primary public network, and/or a primary private network. Additional embodiments may include one or more mobile telephone networks that use various protocols to communicate among mobile devices. For short-range communications within a wireless local-area network (WLAN), the protocols may include 802.11, Bluetooth, and Near Field Communication (NFC).

Figure 5B:
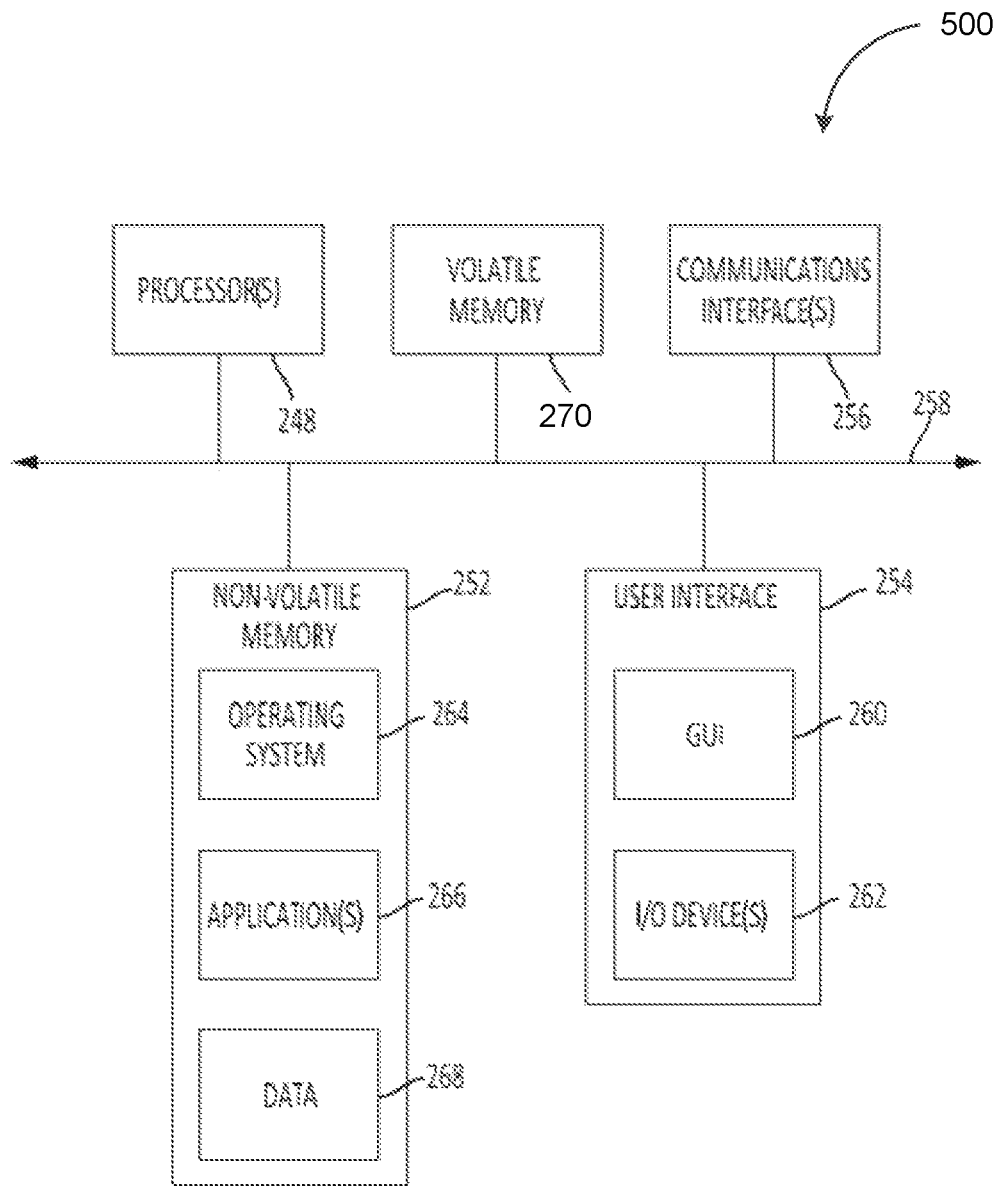
FIG. 5B depicts a block diagram illustrating an example of a computing device, in accordance with some example embodiments.

FIG. 5B depicts a block diagram illustrating an example of a computing device 500, in accordance with some example embodiments. Referring to FIGS. 1-4 and 5A-B, the computing device 500 may be useful for practicing an embodiment of the resource controller 150 and the client device 130.

As shown in FIG. 5B, the computing device 500 may include one or more processors 248, volatile memory 270 (e.g., RAM), non-volatile memory 252 (e.g., one or more hard disk drives (HDDs) or other magnetic or optical storage media, one or more solid state drives (SSDs) such as a flash drive or other solid state storage media, one or more hybrid magnetic and solid state drives, and/or one or more virtual storage volumes, such as a cloud storage, or a combination of such physical storage volumes and virtual storage volumes or arrays thereof), a user interface (UI) 254, one or more communications interfaces 256, and a communication bus 258. The user interface 254 may include a graphical user interface (GUI) 260 (e.g., a touchscreen, a display, and/or the like) and one or more input/output (I/O) devices 262 (e.g., a mouse, a keyboard, and/or the like). The non-volatile memory 252 may store an operating system 264, one or more applications 266, and data 268 such that computer instructions of the operating system 264 and/or applications 266 are executed by the processor(s) 248 out of the volatile memory 270. Data may be entered using an input device of the GUI 260 or received from I/O device(s) 262. Various elements of the computing device 500 may communicate via communication the communication bus 258. The computing device 500 as shown in FIG. 5B is shown merely as an example, as the resource controller 150 and the client device 130 may be implemented by any computing or processing environment and with any type of machine or set of machines that may have suitable hardware and/or software capable of operating as described herein.

The processor(s) 248 may be implemented by one or more programmable processors executing one or more computer programs to perform the functions of the system. As used herein, the term "processor" describes an electronic circuit that performs a function, an operation, or a sequence of operations. The function, operation, or sequence of operations may be hard coded into the electronic circuit or soft coded by way of instructions held in a memory device. A "processor" may perform the function, operation, or sequence of operations using digital values or using analog signals. In some example embodiments, the "processor" can be embodied in one or more application specific integrated circuits (ASICs), microprocessors, digital signal processors, microcontrollers, field programmable gate arrays (FPGAs), programmable logic arrays (PLAs), multi-core processors, or general-purpose computers with associated memory. The "processor" may be analog, digital or mixed-signal. In some example embodiments, the "processor" may be one or more physical processors or one or more "virtual" (e.g., remotely located or "cloud") processors.

The communications interfaces 256 may include one or more interfaces to enable the computing device 500 to access a computer network such as a local area network (LAN), a wide area network (WAN), a public land mobile network (PLMN), and/or the Internet through a variety of wired and/or wireless or cellular connections.

As noted above, in some example embodiments, one or more computing devices 500 may execute an application on behalf of a user of a client computing device (e.g., the clients 120), may execute a virtual machine, which provides an execution session within which applications execute on behalf of a user or a client computing device (e.g., the clients 120), such as a hosted desktop session (e.g., associated with the virtual desktop 135), may execute a terminal services session to provide a hosted desktop environment, or may provide access to a computing environment including one or more of: one or more applications, one or more desktop applications, and one or more desktop sessions in which one or more applications may execute.

Figure 5C:
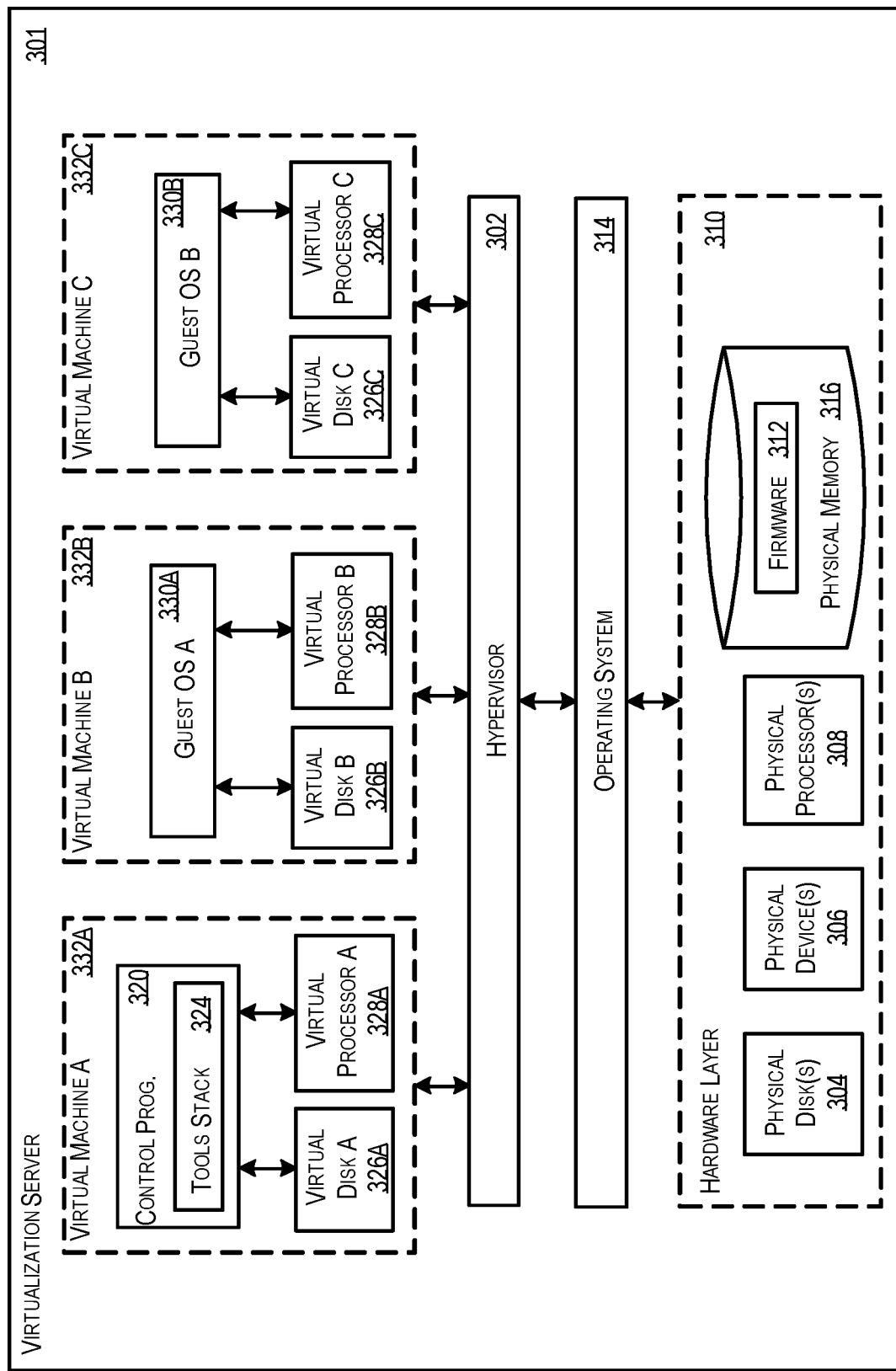
FIG. 5C depicts a high-level architecture of an example of a virtualization system for implementing a computing system, in accordance with some example embodiments.

FIG. 5C depicts a high-level architecture of an example of a virtualization system for implementing the computing system 110, in accordance with some example embodiments. As shown in FIG. 5C, the virtualization system may be a single-server or multi-server system, or a cloud system, including at least one virtualization server 301 configured to provide virtual desktops and/or virtual applications to one or more client access devices 120a-c. A desktop (or a virtual desktop) may refer to a graphical environment (e.g., a graphical user interface) or space in which one or more applications may be hosted and/or executed. A desktop may include a graphical shell providing a user interface for an instance of an operating system in which local and/or remote applications can be integrated. Applications may include programs that execute after an instance of an operating system (and, optionally, also the desktop) has been loaded. Each instance of the operating system may be physical (e.g., one operating system per physical device) or virtual (e.g., many instances of an OS running on a single physical device). Each application may be executed on a local device, or executed on a remotely located device (e.g., remoted).

Virtualization server 301 may be configured as a virtualization server in a virtualization environment, for example, a single-server, multi-server, or cloud computing environment. Virtualization server 301 illustrated in FIG. 5C may be deployed as and/or implemented by one or more embodiments of server 106 illustrated in FIG. 5A or by other known computing devices. Included in virtualization server 301 is hardware layer 310 that may include one or more physical disks 304, one or more physical devices 306, one or more physical processors 308, and one or more physical memories 316. In some embodiments, firmware 312 may be stored within a memory element in physical memory 316 and be executed by one or more of physical processors 308. Virtualization server 301 may further include operating system 314 that may be stored in a memory element in physical memory 316 and executed by one or more of physical processors 308. Still further, hypervisor 302 may be stored in a memory element in physical memory 316 and be executed by one or more of physical processors 308. Presence of operating system 314 may be optional such as in a case where the hypervisor 302 is a Type A hypervisor.

Executing on one or more of physical processors 308 may be one or more virtual machines 332A-C (generally 332). Each virtual machine 332 may have virtual disk 326A-C and virtual processor 328A-C. In some embodiments, first virtual machine 332A may execute, using virtual processor 328A, control program 320 that includes tools stack 324. Control program 320 may be referred to as a control virtual machine, Domain 0, Dom0, or other virtual machine used for system administration and/or control. In some embodiments, one or more virtual machines 332B-C may execute, using virtual processor 328B-C, guest operating system 330A-B (generally 330).

Physical devices 306 may include, for example, a network interface card, a video card, an input device (e.g., a keyboard, a mouse, a scanner, etc.), an output device (e.g., a monitor, a display device, speakers, a printer, etc.), a storage device (e.g., an optical drive), a Universal Serial Bus (USB) connection, a network element (e.g., router, firewall, network address translator, load balancer, virtual private network (VPN) gateway, Dynamic Host Configuration Protocol (DHCP) router, etc.), or any device connected to or communicating with virtualization server 301. Physical memory 316 in hardware layer 310 may include any type of memory. Physical memory 316 may store data, and in some embodiments may store one or more programs, or set of executable instructions. FIG. 5C illustrates an embodiment where firmware 312 is stored within physical memory 316 of virtualization server 301. Programs or executable instructions stored in physical memory 316 may be executed by the one or more processors 308 of virtualization server 301.

Virtualization server 301 may also include hypervisor 302. In some embodiments, hypervisor 302 may be a program executed by processors 308 on virtualization server 301 to create and manage any number of virtual machines 332. Hypervisor 302 may be referred to as a virtual machine monitor, or platform virtualization software. In some embodiments, hypervisor 302 may be any combination of executable instructions and hardware that monitors virtual machines 332 executing on a computing machine. Hypervisor 302 may be a Type 2 hypervisor, where the hypervisor executes within operating system 314 executing on virtualization server 301. Virtual machines may then execute at a layer above hypervisor 302. In some embodiments, the Type 2 hypervisor may execute within the context of a user's operating system such that the Type 2 hypervisor interacts with the user's operating system. In other embodiments, one or more virtualization servers 301 in a virtualization environment may instead include a Type 1 hypervisor (not shown). A Type 1 hypervisor may execute on virtualization server 301 by directly accessing the hardware and resources within hardware layer 310. That is, while Type 2 hypervisor 302 accesses system resources through host operating system 314, as shown, a Type 1 hypervisor may directly access all system resources without host operating system 314. A Type 1 hypervisor may execute directly on one or more physical processors 308 of virtualization server 301, and may include program data stored in physical memory 316.

Hypervisor 302, in some embodiments, may provide virtual resources to guest operating systems 330 or control programs 320 executing on virtual machines 332 in any manner that simulates operating systems 330 or control programs 320 having direct access to system resources. System resources can include, but are not limited to, physical devices 306, physical disks 304, physical processors 308, physical memory 316, and any other component included in hardware layer 310 of virtualization server 301. Hypervisor 302 may be used to emulate virtual hardware, partition physical hardware, virtualize physical hardware, and/or execute virtual machines that provide access to computing environments. In still other embodiments, hypervisor 302 may control processor scheduling and memory partitioning for virtual machine 332 executing on virtualization server 301. Examples of hypervisor 302 may include those manufactured by VMWare, Inc., of Palo Alto, California; Xen Project® hypervisor, an open source product whose development is overseen by the open source XenProject.org community; Hyper-V®, Virtual Server®, and Virtual PC® hypervisors provided by Microsoft Corporation of Redmond, Washington; or others. The virtualization server 301 may execute hypervisor 302 that creates a virtual machine platform on which guest operating systems 330 may execute. When this is the case, virtualization server 301 may be referred to as a host server. An example of such a virtualization server is Citrix Hypervisor® provided by Citrix Systems, Inc., of Fort Lauderdale, Florida.

Hypervisor 302 may create one or more virtual machines 332B-C (generally 332) in which guest operating systems 330 execute. In some embodiments, hypervisor 302 may load a virtual machine image to create virtual machine 332. The virtual machine image may refer to a collection of data, states, instructions, etc. that make up an instance of a virtual machine. In other embodiments, hypervisor 302 may execute guest operating system 330 within virtual machine 332. In still other embodiments, virtual machine 332 may execute guest operating system 330.

In addition to creating virtual machines 332, hypervisor 302 may control the execution of at least one virtual machine 332. The hypervisor 302 may present at least one virtual machine 332 with an abstraction of at least one hardware resource provided by virtualization server 301 (e.g., any hardware resource available within hardware layer 310). In some implementations, hypervisor 302 may control the manner in which virtual machines 332 access physical processors 308 available in virtualization server 301. Controlling access to physical processors 308 may include determining whether virtual machine 332 should have access to processor 308, and how physical processor capabilities are presented to virtual machine 332.

As shown in FIG. 5C, the virtualization server 301 may host or execute one or more virtual machines 332. Virtual machine 332 may be a set of executable instructions and/or user data that, when executed by processor 308, may imitate the operation of a physical computer such that virtual machine 332 can execute programs and processes much like a physical computing device. While FIG. 5C illustrates an embodiment where virtualization server 301 hosts three virtual machines 332, in other embodiments virtualization server 301 may host any number of virtual machines 332. Hypervisor 302 may provide each virtual machine 332 with a unique virtual view of the physical hardware, including memory 316, processor 308, and other system resources 304, 306 available to that virtual machine 332. The unique virtual view may be based on one or more of virtual machine permissions, application of a policy engine to one or more virtual machine identifiers, a user accessing a virtual machine, the applications executing on a virtual machine, networks accessed by a virtual machine, or any other desired criteria. For instance, hypervisor 302 may create one or more unsecure virtual machines 332 and one or more secure virtual machines 332. Unsecure virtual machines 332 may be prevented from accessing resources, hardware, memory locations, and programs that secure virtual machines 332 may be permitted to access. In other embodiments, hypervisor 302 may provide each virtual machine 332 with a substantially similar virtual view of the physical hardware, memory, processor, and other system resources available to virtual machines 332.

Each virtual machine 332 may include virtual disk 326A-C (generally 326) and virtual processor 328A-C (generally 328.) Virtual disk 326 may be a virtualized view of one or more physical disks 304 of virtualization server 301, or a portion of one or more physical disks 304 of virtualization server 301. The virtualized view of physical disks 304 may be generated, provided, and managed by hypervisor 302. In some embodiments, hypervisor 302 may provide each virtual machine 332 with a unique view of physical disks 304. These particular virtual disk 326 (included in each virtual machine 332) may be unique, when compared with other virtual disks 326.

Virtual processor 328 may be a virtualized view of one or more physical processors 308 of virtualization server 301. The virtualized view of physical processors 308 may be generated, provided, and managed by hypervisor 302. Virtual processor 328 may have substantially all of the same characteristics of at least one physical processor 308. Virtual processor 308 may provide a modified view of physical processors 308 such that at least some of the characteristics of virtual processor 328 are different from the characteristics of the corresponding physical processor 308.

One or more aspects or features of the subject matter described herein can be realized in digital electronic circuitry, integrated circuitry, specially designed application-specific integrated circuit (ASIC), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example, as would a processor cache or other random access memory associated with one or more physical processor cores.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. For example, the logic flows may include different and/or additional operations than shown without departing from the scope of the present disclosure. One or more operations of the logic flows may be repeated and/or omitted without departing from the scope of the present disclosure. Other implementations may be within the scope of the following claims.

What is claimed is:

1. A system, comprising:
    at least one data processor; and
    at least one memory storing instructions, which when executed by the least one data processor, cause the at least one data processor to at least:
        determine, based on a weight matrix, a first weight for a first type of operation, the first weight being an inverse of a first quantity of the first type of operation a first hardware resource is capable of performing during a time interval;
        determine a second quantity of the first type of operation offloaded to the first hardware resource during the time interval;
        determine, based at least on the first weight and the second quantity, a first utilization of the first hardware resource;
        adjust, based at least on the first utilization, an allocation of hardware resources;
        in response to the first utilization of the first hardware resource increasing at an above threshold rate, increase the allocation of hardware resources; and
        in response to the first utilization of the first hardware resource decreasing at the above threshold rate, decrease the allocation of hardware resources.

2. The system of claim 1, wherein the at least one data processor is further caused to at least:
    determine, based on the weight matrix, a second weight for a second type of operation, the second weight being an inverse of a second quantity of the second type of operation the first hardware resource is capable of performing during the time interval;
    determine a third quantity of the second type of operation offloaded to the first hardware resource during the time interval; and
    determine, further based at least on the second weight and third second quantity, the first utilization of the first hardware resource.

3. The system of claim 1, wherein the at least one data processor is further caused to at least:
    determine a second weight for the first type of operation, the second weight being an inverse of a second quantity of the first type of operation a second hardware resource is capable of performing during the time interval, the second hardware resource being a different type of hardware resource;
    determine a third quantity of the first type of operation offloaded to the second hardware resource during the time interval;
    determine, based at least on the second weight and third second quantity, a second utilization of the second hardware resource; and
    adjust, further based at least on the second utilization, the allocation of hardware resources.

4. The system of claim 3, wherein the allocation of hardware resources is adjusted based on an average of the first utilization of the first hardware resource and the second utilization of the second hardware resource.

5. The system of claim 1, wherein the at least one data processor is further caused to at least:
    detect an operation being offloaded for performance by the first hardware resource; and
    in response to the operation being the first type of operation, increment a counter associated with the first type of operation, the second quantity of the first type of operation offloaded to the first hardware resource during the time interval being determined based at least on a value of the counter.

6. The system of claim 1, wherein the at least one data processor is further caused to at least:
    in response to the first utilization of the first hardware resource exceeding a first threshold value, increase the allocation of hardware resources; and
    in response to the first utilization of the first hardware resource being below a second threshold value, decrease the allocation of hardware resources.

7. The system of claim 1, wherein the first hardware resource comprises a cryptographic accelerator dedicated to performing cryptographic operations.

8. The system of claim 1, wherein the first type of operation comprises a Rivest-Shamir-Adleman (RSA) operation, an Advanced Encryption Standard (AES) operation, a Elliptic Curve Cryptography (ECC) operation, a Data Encryption Standard (DES) operation, a Secure Hash Algorithms (SHA) operation, or a Diffie-Hellman (DH) operation.

9. The system of claim 1, wherein the first hardware resource is part of an application delivery controller configured to perform a Secure Socket Layer (SSL) offload by at least performing the second quantity of the first type of operation.

10. A computer-implemented method, comprising:
    determining, based on a weight matrix, a first weight for a first type of operation, the first weight being a first quantity of the first type of operation a first hardware resource is capable of performing during a time interval;
    determining a second quantity of the first type of operation offloaded to the first hardware resource during the time interval;
    determining, based at least on the first weight and the second quantity, a first utilization of the first hardware resource;
    adjusting, based at least on the first utilization, an allocation of hardware resources;
    in response to the first utilization of the first hardware resource increasing at an above threshold rate, increasing the allocation of hardware resources; and
    in response to the first utilization of the first hardware resource decreasing at the above threshold rate, decreasing the allocation of hardware resources.

11. The method of claim 10, further comprising:
    determining, based on the weight matrix, a second weight for a second type of operation, the second weight being an inverse of a second quantity of the second type of operation the first hardware resource is capable of performing during the time interval;
    determining a third quantity of the second type of operation offloaded to the first hardware resource during the time interval; and
    determining, further based at least on the second weight and third second quantity, the first utilization of the first hardware resource.

12. The method of claim 10, further comprising:
    determining a second weight for the first type of operation, the second weight being an inverse of a second quantity of the first type of operation a second hardware resource is capable of performing during the time interval, the second hardware resource being a different type of hardware resource;

determining a third quantity of the first type of operation offloaded to the second hardware resource during the time interval;

determining, based at least on the second weight and third second quantity, a second utilization of the second hardware resource; and adjusting, further based at least on the second utilization, the allocation of hardware resources.

13. The method of claim 12, wherein the allocation of hardware resources is adjusted based on an average of the first utilization of the first hardware resource and the second utilization of the second hardware resource.

14. The method of claim 10, further comprising:

detecting an operation being offloaded for performance by the first hardware resource; and in response to the operation being the first type of operation, incrementing a counter associated with the first type of operation, the second quantity of the first type of operation offloaded to the first hardware resource during the time interval being determined based at least on a value of the counter.

15. The method of claim 10, further comprising:

in response to the first utilization of the first hardware resource exceeding a first threshold value, increasing the allocation of hardware resources; and in response to the first utilization of the first hardware resource being below a second threshold value, decreasing the allocation of hardware resources.

16. The method of claim 10, wherein the first hardware resource comprises a cryptographic accelerator dedicated to performing cryptographic operations.

17. The method of claim 10, wherein the first type of operation comprises a Rivest-Shamir-Adleman (RSA) operation, an Advanced Encryption Standard (AES) operation, a Elliptic Curve Cryptography (ECC) operation, a Data Encryption Standard (DES) operation, a Secure Hash Algorithms (SHA) operation, or a Diffie-Hellman (DH) operation.

18. A non-transitory computer readable medium storing instructions, which when executed by at least one data processor, result in operations comprising:

operation means for determining, based on a weight matrix, a first weight for a first type of operation, the first weight corresponding to a first quantity of the first type of operation a first hardware resource is capable of performing during a time interval;

operation means for determining a second quantity of the first type of operation offloaded to the first hardware resource during the time interval;

operation means for determining, based at least on the first weight and the second quantity, a first utilization of the first hardware resource; and operation means for adjusting, based at least on the first utilization, an allocation of hardware resources;

wherein the first weight is an inverse of the first quantity of the first type of operation the first hardware resource is capable of performing during the time interval.

19. The non-transitory computer readable medium of claim 18 wherein the operations further comprise:

operation means for adjusting, based on a rate of change of the first utilization of the first hardware resource, the allocation of hardware resources.

* * * * *